United States Patent
Persson et al.

(10) Patent No.: US 9,531,295 B2
(45) Date of Patent: Dec. 27, 2016

(54) CONVERTER HAVING AUXILIARY RESONANT CIRCUIT WITH CURRENT DISCRIMINATING INDUCTOR

(71) Applicant: COMSYS AB, Lund (SE)

(72) Inventors: Jonas Persson, Lund (SE); Erik Hansson, Lund (SE)

(73) Assignee: COMSYS AB, Lund (SE)

( * ) Notice: Subject to any disclaimer, the term of this patent is extended or adjusted under 35 U.S.C. 154(b) by 136 days.

(21) Appl. No.: 14/415,422

(22) PCT Filed: Jul. 3, 2013

(86) PCT No.: PCT/SE2013/050855
§ 371 (c)(1),
(2) Date: Jan. 16, 2015

(87) PCT Pub. No.: WO2014/007745
PCT Pub. Date: Jan. 9, 2014

(65) Prior Publication Data
US 2015/0194873 A1    Jul. 9, 2015

Related U.S. Application Data (60) Provisional application No. 61/676,037, filed on Jul. 26, 2012, provisional application No. 61/676,061, filed on Jul. 26, 2012.

(30) Foreign Application Priority Data

Jul. 6, 2012 (SE) ...................................... 1250800

(51) Int. Cl.
*H02M 7/48* (2007.01)
*H02M 1/12* (2006.01)
*H02M 1/00* (2006.01)

(52) U.S. Cl.
CPC ................ *H02M 7/48* (2013.01); *H02M 1/12* (2013.01); *H02M 2001/0051* (2013.01);
(Continued)

(58) Field of Classification Search
CPC ............. H02M 2001/0051; H02M 2001/0058; H02M 2001/0064; H02M 1/12; H02M 1/4241; H02M 7/48; H02M 2007/4811; H02M 2007/4815; H02M 7/483
See application file for complete search history.

(56) References Cited

U.S. PATENT DOCUMENTS 5,047,913 A * 9/1991 De Doncker ....... H02M 7/4826
363/138
5,949,669 A * 9/1999 Bruckmann ............... B60L 9/16
363/132

(Continued)

FOREIGN PATENT DOCUMENTS

CN        101847933 A    9/2010
DE         288944 A5     4/1991

OTHER PUBLICATIONS

International Search Report from Application No. PCT/SE2013/050855 mailed Oct. 16, 2013.
(Continued)

*Primary Examiner* — Fred E Finch, III
(74) *Attorney, Agent, or Firm* — Calfee Halter & Griswold LLP (57) ABSTRACT

A resonant power converter includes a DC power source, a positive DC conductor, a negative DC conductor, a phase conductor, and a power converting unit between the DC power source and phase conductor. The power converting unit includes a first switch between the positive DC conductor and phase conductor, a first diode in parallel with the first switch, a second switch between the negative DC conductor and phase conductor, and a second diode in
(Continued)

parallel with the second switch. The resonant power converter includes a resonant auxiliary switching circuit between the DC power source and phase conductor. The resonant auxiliary switching circuit includes an inductor in series with a control means, and auxiliary diodes in series with the control means. The inductor is a current discriminating inductor adapted to become saturated by currents flowing through the inductor during normal operation such that the inductance of the inductor is reduced.

13 Claims, 7 Drawing Sheets

(52) U.S. Cl.
CPC ............... *H02M 2001/0058* (2013.01); *H02M 2007/4811* (2013.01); *H02M 2007/4815* (2013.01); *Y02B 70/1441* (2013.01)

(56) References Cited

U.S. PATENT DOCUMENTS

| | | | | |
|---|---|---|---|---|
| 6,069,472 A * | 5/2000 | Pernyeszi | ............... | H02M 7/48 323/282 |
| 6,236,191 B1 * | 5/2001 | Chaffai | ............... | H02M 1/34 323/222 |
| 6,341,078 B1 * | 1/2002 | Miller | ............... | H02M 7/5387 363/132 |
| 7,289,888 B2 * | 10/2007 | Persson | ............... | G06F 1/14 307/105 |
| 2001/0033507 A1 * | 10/2001 | Li | ............... | H02M 7/48 363/132 |
| 2012/0187879 A1 * | 7/2012 | Galea | ............... | H02M 7/5387 318/400.29 |
| 2015/0207408 A1 * | 7/2015 | Liljegren | ............... | H02M 7/48 323/271 |
| 2015/0318794 A1 * | 11/2015 | Hansson | ............... | H02M 7/5387 327/552 |

OTHER PUBLICATIONS

International Preliminary Report on Patentability from Application No. PCT/SE2013/050855 mailed Jun. 3, 2014.

Pfisterer H-J et al., "A Superconducting Magentic Energy Storage System (SMES) for the Improvement of Power Quality" Magnetics Conference 2000. Intermag 2000 Digest of Technical Papers. 2000 IEEE International Apr. 9-13, 2000, USA, IEEE, Apr. 9, 2000, pp. 341.

Thelen, R F et al., "A 2-MW Motor and ARCP Drive for High-Speed Flywheel" Applied Power Electronics Conference, APEC 2007—Twenty Second Annual IEEE, pp. 1690-1694.

Bellar, M D et al., "A Review of Soft-Switched DC-AC Converters" IEEE Transactions on Industry Applications, Aug. 1, 1998, vol. 34 (14 pgs).

* cited by examiner

CONVERTER HAVING AUXILIARY RESONANT CIRCUIT WITH CURRENT DISCRIMINATING INDUCTOR

CROSS-REFERENCE TO RELATED APPLICATION

This application is the U.S. national phase entry of PCT/SE2013/050855, with an international filing date of 3 Jul. 2013, which claims the benefit of Sweden Application Serial No. 1250800-8, with a filing date of Jul. 6, 2012, U.S. Application No. 61/676,037 with a filing date of Jul. 26, 2012 and U.S. Application No. 61/676,061, with a filing date of Jul. 26, 2012, the entire disclosures of which are fully incorporated herein by reference.

TECHNICAL FIELD

The invention generally relates to power converters using resonance for limiting the power required for switching.

BACKGROUND

In power converters, losses appear as none of the components has ideal characteristics. The losses introduce heat in the power circuitry, which apart from consuming energy introduces thermal strain to all components, reducing their life span.

It is desirable to increase the frequency of operation of power converters as the generated output then can be more exactly controlled. Increasing the switching frequency leads to lower switching ripple, and smaller component values which in turn leads to a more compact, light-weight and cost-effective implementation of the invention. Further, lower switching ripple allows for potentially lowered EMI, which aligns with the goal of a non-disturbing switch. Still further, having a high switching frequency allows for higher frequency currents to be generated by the power converter, widening the range of applications suitable for the converter.

However, increasing the frequency also increases switching losses, as most losses appear on switching cycle basis. Forcing the transistor to commutate while a current is flowing through it or when there is a potential difference over it, requires energy which must be supplied to the gate of the transistor. Thus, reducing the current through the transistor or the voltage thereover reduces the total power input for the switch and thus the total power input to the system.

One way of reducing the losses over a particular switch is to ad a resonant component to the circuitry in which a current is generated by an inductive element, by the discharge of a capacitor. A circuit employing this technique is known as a resonant converter, and the method of using resonance to facilitate commutation is known as soft switching. There are generally two types of soft-switching: low-voltage switching and low-current switching. Low-voltage switching involves minimizing the voltage or potential difference over the switch prior to commutation, whereas low-current switching involves minimizing the current through the switch prior to switching.

One soft switching solution is provided in U.S. Pat. No. 5,047,913 (to De Doncker et al.). De Doncker suggests using controlled switches in the resonant auxiliary circuitry for overcoming the problem of active device switching losses in power converters. The reduction of losses in the power converters enables operation at higher switching frequencies. De Doncker describes that the resonant output voltage may fall short of the opposite rail voltage due to component resistances, device conduction losses and inadequate forcing potential. As a result, the next switching device in the inverter pole to be turned on may be switched at the peak of the resonating voltage, and hence must absorb some switching losses due to the non-zero voltage turn-on, including the energy dump from the parallel capacitor.

All switching loads cause electromagnetic interference (EMI), and in high voltage applications, such as active filters, the EMI is particularly large. Regulations demand that electronics do not emit EMI over certain values, and generating less EMI is therefore an important goal in its own right. In applications where the converter or inverter is connected directly to the grid, EMI noise can cause problems which are normally solved by employing Electro Magnetic Compatibility (EMC) filters. EMC filters must be placed in series with the converter, thereby handling the full current capacity. By minimizing the EMI, EMC filters can be eliminated from the converter design, which reduces the size and cost of the circuitry.

A resonant converter comprises two main switching devices per phase. The switching devices have diodes connected in parallel therewith. The resonant converter further comprises an auxiliary resonant commutation circuit including auxiliary switching devices coupled in series with an inductor and a capacitor. When a diode is switched from a non-conducting to a conducting state and vice versa is has an intrinsic recovery time due to the charge carriers stored in the diode, during this recovery time, the diode can conduct in the reverse direction as the diode does not attain its blocking capability until the charge in the junction is depleted. The reverse recovery time is typically in the range 10-1000 ns during which time a reverse recovery current flows through the diode in the reverse direction.

The reverse recovery current brings increased EMI noise as the reverse recovery current along with the reactive elements of the circuitry creates harmonics, the effect can be significant when switching large currents at high frequency. To decrease the amount of losses in the system and increase the switching speeds it would be advantageous to have a resonant converter in which the problem with the reverse recovery current of the diodes is reduced.

SUMMARY

A resonant power converter is provided. The resonant power converter comprises a DC power source, a positive DC conductor, a negative DC conductor, a phase conductor, and a power converting unit coupled between the DC power source and the phase conductor, the power converting unit comprising: a first switch coupled between the positive DC conductor and the phase conductor and a first diode connected in parallel with the first switch, a second switch coupled between the negative DC conductor and the phase conductor and a second diode connected in parallel with the second switch.

The resonant power converter further comprises a resonant auxiliary switching circuit coupled between a feeding connection on the DC power source and the phase conductor. The resonant auxiliary switching circuit comprising: at least one inductor coupled in series with control means for controlling the resonant auxiliary switching circuit, and auxiliary diodes coupled in series with the control means characterized in that the inductor is a current discriminating inductor adapted to: become saturated by currents flowing through the inductor during normal operation such that the inductance of the inductor is reduced.

As reverse recovery currents flowing through the auxiliary diodes and the current discriminating inductor is below the saturation current, the inductor operates in its linear region damping the current and thus reducing the reverse recovery current running through the auxiliary switch, whereas in normal operation, when the auxiliary switching current is running through the inductor and in the forward direction through the auxiliary diodes, it rapidly becomes saturated making the inductor function as a purely resistive component. By the introduction of a high inductance at high frequencies and rapid saturation, reverse recovery currents having high frequencies can efficiently be dampened without the introduction of further inductance during normal operation. The circuitry can thus be protected substantially without any negative effects on the performance of the converter.

According to one embodiment, of the resonant power converter the inductance of the current discriminating inductor is adapted to be reduced to less than 50% when saturated during normal operation.

According to one embodiment, the inductance of the current discriminating inductor is adapted to be reduced to less than 20% when saturated during normal operation.

According to one embodiment, the current discriminating inductor is connected in series with a second inductor adapted to have a substantially constant inductance in normal operation, when the first current discriminating inductor is substantially saturated.

According to one embodiment, the current discriminating inductor is adapted to operate in its substantially linear region when a reverse recovery current is flowing through the auxiliary diodes and current discriminating inductor, and operate with inductance reduced to less than 50% of the inductance in the linear region, when a current being larger than the reverse recovery current is flowing in the forward direction during normal operation.

According to one embodiment, the current discriminating inductor is an inductor comprising magnetic material adapted to become magnetically saturated after an amount of current has flowed through the inductor. The magnetic material may be an iron core of the inductor.

According to one embodiment, the non-linear inductor is adapted to become saturated by currents being substantially larger than the reverse recovery current and flowing in the forward direction, such that the inductor functions as an inductive element having an inductance being less than 20% of the first inductance.

According to one embodiment, the non-linear inductor is a current discriminating inductor comprising magnetic material adapted to become magnetically saturated after an amount of current has flowed through the current discriminating inductor. Implementing the current discriminating inductor as a current discriminating inductor comprising a magnetic material adapted to become magnetically saturated is a cheap, simple and robust way of designing the circuitry for the inventive purpose. The magnetic material is for example an iron core of the inductor.

According to one embodiment, the current discriminating inductor is an inductor with an inductance in the range 0.5-50 µH, according to another embodiment, the current discriminating inductor is an inductor with an inductance in the range 0.5-20 µH according to another embodiment, the current discriminating inductor is an inductor with an inductance in the range 1-10 µH, according to another embodiment, the current discriminating inductor is an inductor with an inductance in the range 3-7 µH, according to another embodiment, the current discriminating inductor is an inductor with an inductance in the range 4-6 µH.

According to one embodiment, the current discriminating inductor is an inductor with a saturation current of in the range 0.5-50 A, according to another embodiment, the current discriminating inductor is an inductor with a saturation current in the range 1-20 A, according to another embodiment, the current discriminating inductor is an inductor with a saturation current in the range 1-10 A, according to another embodiment, the current discriminating inductor is an inductor with a saturation current in the range 3-7 A, thus making the circuitry suitable for mid-voltage power electronic applications.

According to one embodiment, the first and second inductor is part of an integrated inductive component comprising the first inductor comprising a first iron core and at least one lead winding encircling the first iron core, and the second inductor comprising a second iron core and a plurality of lead windings encircling the second iron core. The first iron core has a smaller mass than the second iron core, such that the first iron core gets magnetically saturated faster than the second iron core when current flows in the windings. The integrated inductive component is a compact and purposeful design.

According to one embodiment, the first iron core has a mass being less than 10% of the mass of the second iron core.

According to one embodiment, the first and second iron cores are ring or torus shaped, and the first iron core is positioned at least partially inside of the second iron core.

According to one embodiment, the saturation current of the second inductor is more than 10 times the saturation current of the first inductor.

The resonant power converter could for example be used in an active filter or a voltage transformer.

Please note that any embodiment or part of embodiment could be combined in any way.

BRIEF DESCRIPTION OF THE DRAWINGS

The invention is now described, by way of example, with reference to the accompanying drawing, in which:

FIG. 7a shows an embodiment of an inductor having a current discriminating portion placed centrally.

FIG. 7b shows an impedance graph of the inductor according to the embodiment shown in FIG. 7a.

DETAILED DESCRIPTION

The fundamentals of resonant switching implementing a current discriminating inductor will now be described by means of an example, under reference to the accompanying drawings. It will be appreciated that the drawings are for illustration only and are not in any way restricting the scope.

In the following figures the power converter is illustrated for use in an active filter. However, this embodiment is only to be seen as an example of one use of the power converter. The inventive concept defined by the claim could be used in all applications in which a resonant power converter is advantageous.

The power converter in an active filter creates a compensating current which compensates for loads in a power system creating harmonics. By reducing the harmonics in the electrical system the reactive effect produced is reduced and thus the over-all energy consumption is lowered. A further description of the details of an active filter could for example be found in U.S. Pat. No. 7,289,888 to Persson. The electrical system is illustrated in the following figures by an energy supplying unit 4, an energy consuming load 5 and a main conductor 3 for transferring energy from the energy supplying unit 4 to the energy consuming unit 5. The energy supplying unit 4 could for example be the power grid or a transformer reducing the voltage supplied from the main power grid. The energy consuming load 5 could for example be an electrical motor. The active filter further comprises an inductor L1 which transforms the pulses generated by the switches Gp, Gn to a continuous signal by opposing the changes in current through it by developing a voltage across the inductor proportional to the rate of change of the current in accordance with $I=-LdU/dt$. For an active filter configured for 100 A current the inductor typically is an inductor in the range 200-250 uH.

Figure 1:
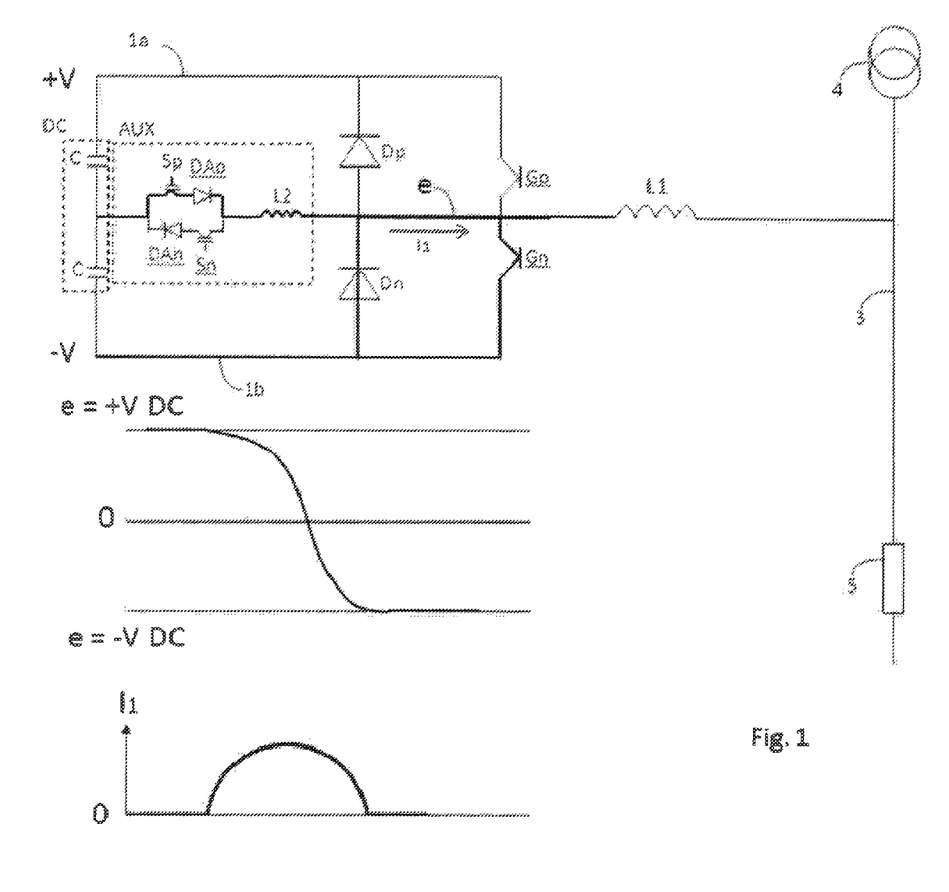
FIG. 1 shows a circuit for resonant switching, when the output current is switched from having the voltage +V to having the voltage −V.

FIG. 1 shows a circuitry for resonant power conversion. The resonant converter comprises two main switching devices Gp, Gn per phase. The switching devices have diodes Dp, Dn connected in parallel therewith. The resonant converter further comprises an auxiliary resonant commutation circuit AUX including auxiliary switching devices Sp, Sn, coupled in series with an inductor L2 and a feeding connection on the DC power source (DC). The DC power source is according to this embodiment two capacitors C. In the preferred embodiment, IGBTs are used for both the main switching device Gp, Gn and the auxiliary switching devices Sp, Sn, due to the high switching frequencies, but the invention is suitable for use with many types of switching devices, such as (but not limited to) BJTs, MOSFETs, MCTs, GTOs or IGCTs. FIG. 1 describes the operation of the resonant switch when no current is running through L1. In order to force the voltage from +V to −V, additional current needs to be supplied by the resonant circuitry. As a first step in the switching cycle, the switch Gp is turned off such that the current ceases to flow from the positive lead +V. The voltage in the phase conductor e is now the positive voltage +V and no current is flowing. The switch Sp is turned on closing the resonant circuit causing the capacitor C to discharge through the switch Sp and the diode DAp and thus altering the potential difference over the inductor L2, creating a current which is supplied to the phase conductor e. The resonant circuit thus supplies a forcing potential substantially equal to half the voltage difference between −V and +V. This causes the potential in the phase conductor e to go down towards −V at which time current stars to flow through the negative diode Dn. At this point, the potential difference over the negative switch Gn is reduced such that Gn can be switched without any voltage thereacross.

Figure 2:
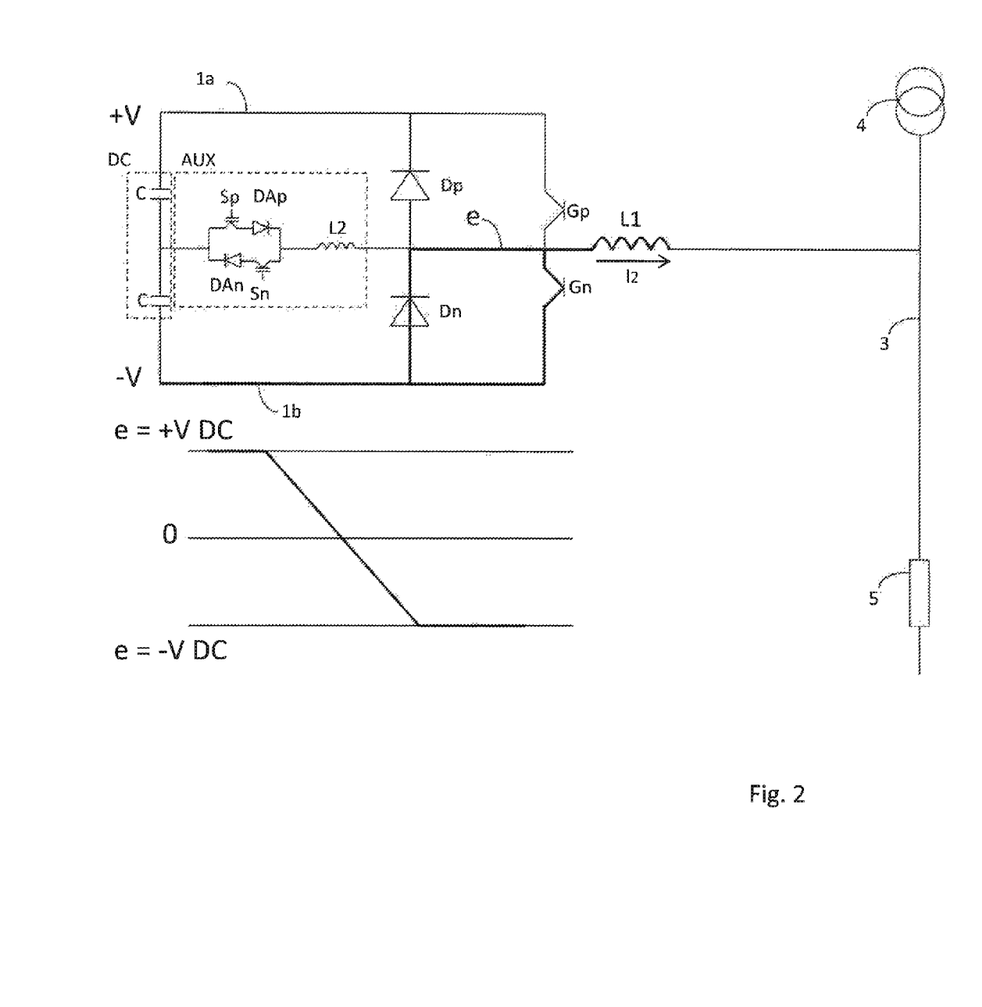
FIG. 2 shows a circuit for resonant switching, when the output current is switched from having the voltage +V to having the voltage −V.

FIG. 2 shows a second alternative in which the object is to switch from +V to −V when a current is running through L1. The positive switch Gp is turned off, however, as L1 holds a magnetic field it will continue to drive a current I2 therethrough from the diode Dn causing the voltage in the main lead to drop from +V to −V thus reducing the voltage difference over switch Gn such that the switch Gn can be switched with very small losses.

Figure 3:
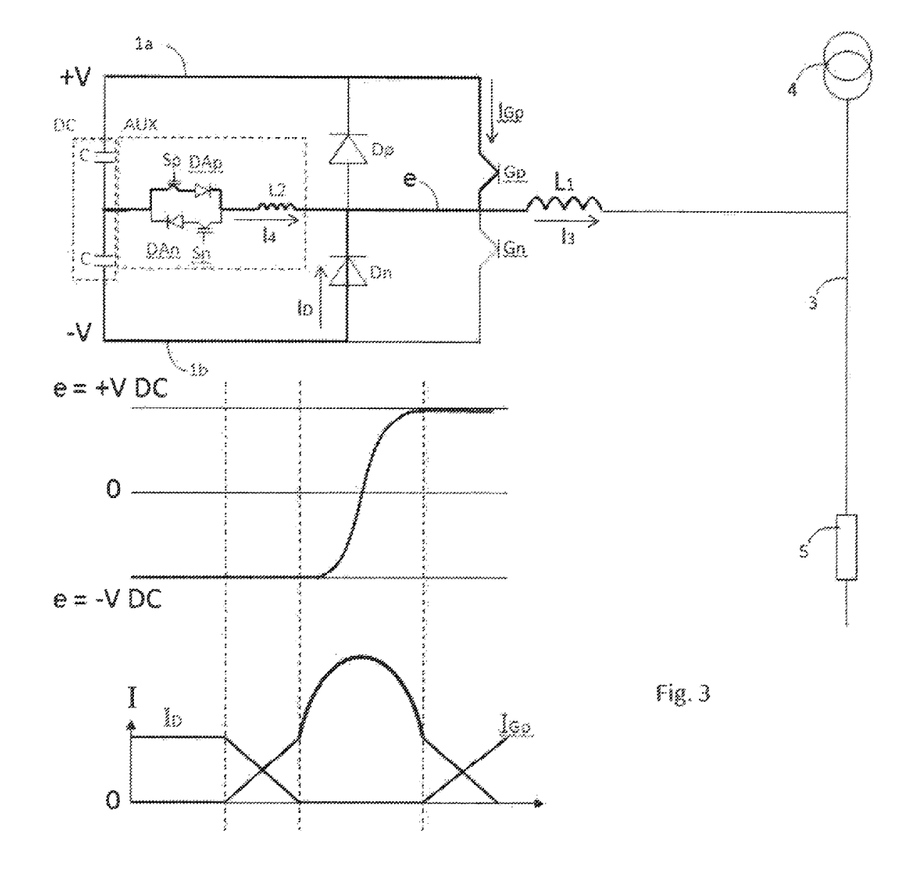
FIG. 3 shows a circuit for resonant switching, when the output current is switched from having the voltage −V to having the voltage +V.

FIG. 3 shows a third switching operation in which switching is performed from −V to +V when a current is running through the inductor L1. As a first step, the negative switch Gn is turned off causing a current I3 driven by the inductor L1 to continue to run through the negative diode Dn (denoted as diode current Id). Sp is turned on, closing the auxiliary circuit AUX discharging C and driving an auxiliary current I4 by means of L2, causing the voltage to rise in the main lead and thus lowering the voltage difference over Gp. When the voltage over Gp is approaching zero, Gp is turned on and the current IGp starts to flow through Gp and Sp is turned off.

In the switching operation described under reference to FIG. 1, when the diode DAp (analogous for DAn in other switching operations) in the auxiliary switch, is switched from the conducting state to a non-conducting state it has an intrinsic recovery time due to the charge carriers stored in the diode DAp. During this recovery time, the diode DAp can conduct in the reverse direction as the diode does not attain its blocking capability until the charge in the junction is depleted. This causes current to flow in the reverse direction through the diode DAp as the inductor L2 continues to drive current by consuming the energy stored in the magnetic field of the inductor L2. This time is known as the reverse recovery time and is typically in the range 10-1000 ns.

Figure 4:
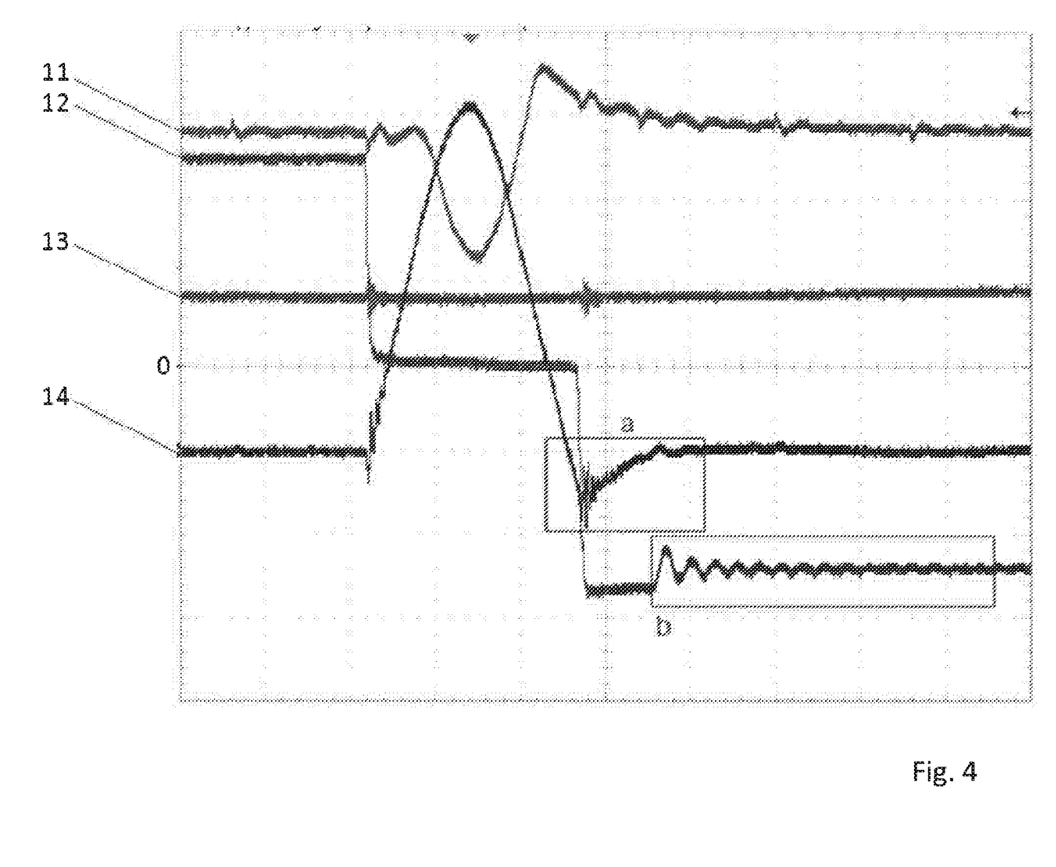
FIG. 4 shows a chart of the derivatives of the output current, the resonant current, the step edge detector signal and a reference probe, when the switching circuit described in FIG. 1 is used for switching the output current is switched from having the voltage +V to having the voltage −V.

FIG. 4 shows a chart of the voltage of the current supplied by the auxiliary switch, indicated as 14, and how the auxiliary current drives down the voltage 12 in the phase conductor (e in FIG. 1) to 0 potential prior to switching. The reverse recovery effect in the diode DAp can be seen in the area a as the voltage is driven down below −V as an oscillating current flows in the reverse direction through the diode DAp as the inductor L2 continues to drive current by consuming the energy stored in the magnetic field of the inductor L2. 11 is a step detector signal and 13 is a reference probe not connected to the circuitry and thus functioning as an antenna picking up signals caused by EMI. As can be seen from the reference probe 13, the switching generates substantial EMI that the reference probe detects.

The oscillating reverse recovery current brings increased EMI noise and the effect can be significant when switching large currents very quickly. To decrease the amount of losses in the system and increase the switching speeds it would be advantageous to have a resonant converter in which the problem with the reverse recovery current of the diodes is reduced.

Figures 5A, 5B:
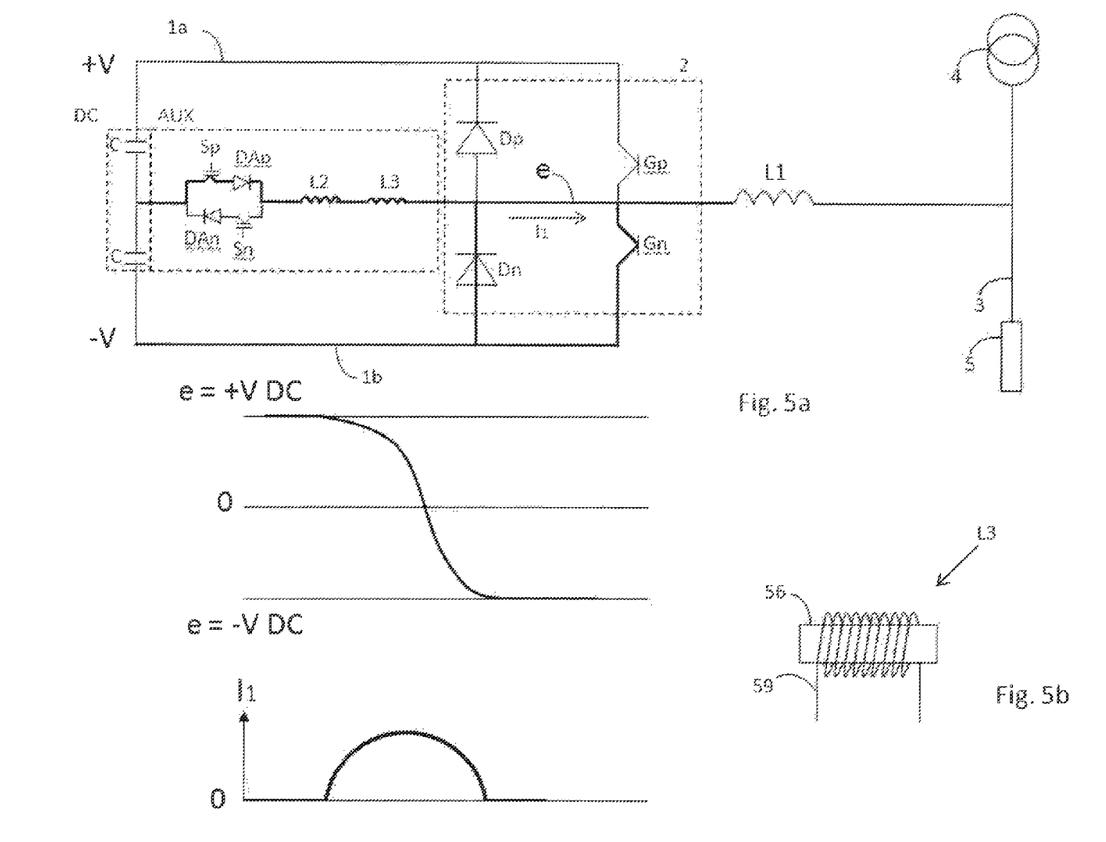
FIG. 5a, 5b shows a circuit for resonant switching including a current discriminating inductor, when the output current is switched from having the voltage +V to having the voltage −V.

FIG. 5a shows a switching circuit similar to the circuit shown in FIG. 1, the difference being the introduction of an additional current discriminating inductor L3 with non-linear characteristics which becomes saturated by the auxiliary current running therethrough. An inductor is an electrical element that stores energy in a magnetic field. An inductor with linear characteristics stores energy in its magnetic field proportionally to the amount of current flowing through the inductor and uses the energy to oppose change in the current that created the magnetic field. A non-linear inductor or current discriminating inductor is an inductor having non-linear characteristics, meaning that the build-up of the magnetic field varies with the current flowing through the inductor.

The current discriminating inductor L3 is based on saturation of a magnetic material, such as the iron core (56 in FIG. 5b) of the inductor L3. The iron core is magnetized by the build-up of the magnetic field of the inductor from the current passing through the windings of the coil (59 of FIG. 5b). The magnetic field aligns the microscopic magnetic domains of the iron core causing their magnetic fields to turn and align parallel to the external field. The more current flowing through the inductor, the higher the build-up of the magnetic field and the more the magnetic domains align. As more and more magnetic domains align, the amount of available magnetic domains that can align along with the increase in current is reduced, and with that the current discriminating inductors capability of storing energy in a magnetic field. Complete magnetic saturation occurs when all the domains are lined up such that further increase in the current flowing through the inductor cannot cause further alignment of magnetic domains.

The saturation of the iron core 56 makes the resulting inductance a function of the applied current. As the inductances aims to protect the auxiliary circuit AUX from the reverse recovery currents, it is important that the component values of the inductor L3 is selected based on the frequency of the auxiliary circuit AUX. In the embodiment shown in FIG. 5a, the inductor L3 has an inductance of 3 uH and a saturation current of 3 A, which means that for currents below 3 A the inductor L3 has the inductance 3 uH and for applied currents above 3 A the inductor L3 has the inductance OuH. When the auxiliary switching device Sp closes and causes a current to flow from the capacitor C through the auxiliary switch, the inductor L3 quickly becomes saturated which means that it now functions as a purely resistive element. When the auxiliary circuit has driven a current causing the voltage in the phase conductor to go down to −V, the switch Gn is closed and the current flows from the negative conductor 1b to the phase conductor e. As the diode DAp of the auxiliary switch AUX still contains charge carriers a reverse recovery current starts to flow in the opposite direction. The reverse recovery current causes a buildup of a magnetic filed in the inductor L3 as the reverse recovery current is below the saturation current (in this example 3 A) and the inductor L3 thus operates in its linear region damping the current and thus reducing the reverse recovery current running through the auxiliary switch. The result is that the derivative of the resonance current (shown as 14 in FIGS. 4 and 6) will be smaller, and the derivative of the reverse recovery current will be smaller in the region where the inductor L3 is active as the resulting inductance will be L2+L3. As the derivative of the reverse recovery current will be smaller the total reverse recovery charge that needs to be forced from the diode will be smaller. Furthermore the oscillations of the current supplied to the phase conductor from the DC power supply will be smaller resulting in a more stable compensating current from the switch.

Figure 6:
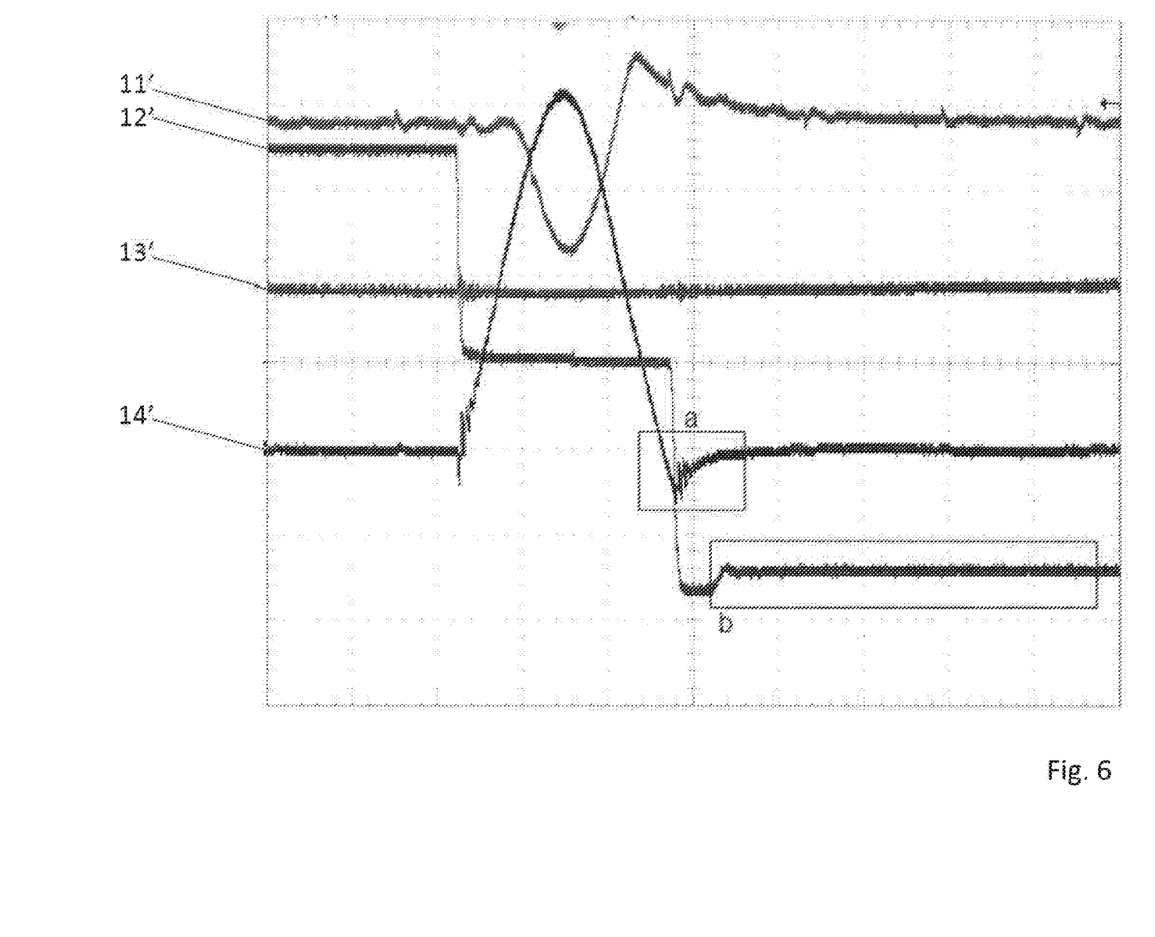
FIG. 6 shows a chart of the derivatives of the output current, the resonant current, the step edge detector signal and a reference probe, when the switching circuit described in FIG. 3 including the non-linear inductor is used for switching the output current is switched from having the voltage +V to having the voltage −V.

FIG. 6 shows a chart of the same switching cycle shown in the chart in FIG. 4 and described under reference to FIG. 1, when the current discriminating inductor (L3) is active. What can be seen in the area a, in the voltage 14', is that the effects of the oscillating reverse recovery current is reduced. Furthermore it can be seen in the area b that the oscillations in the voltage of the output current 12' is reduced and the switch thus provides a more stable and more precise output reducing the EMI. The reduction of EMI can also be seen in the reference probe 13' as the ripple picked-up by the reference probe is substantially lower than in the example shown in FIG. 4.

Figures 7A, 7B:
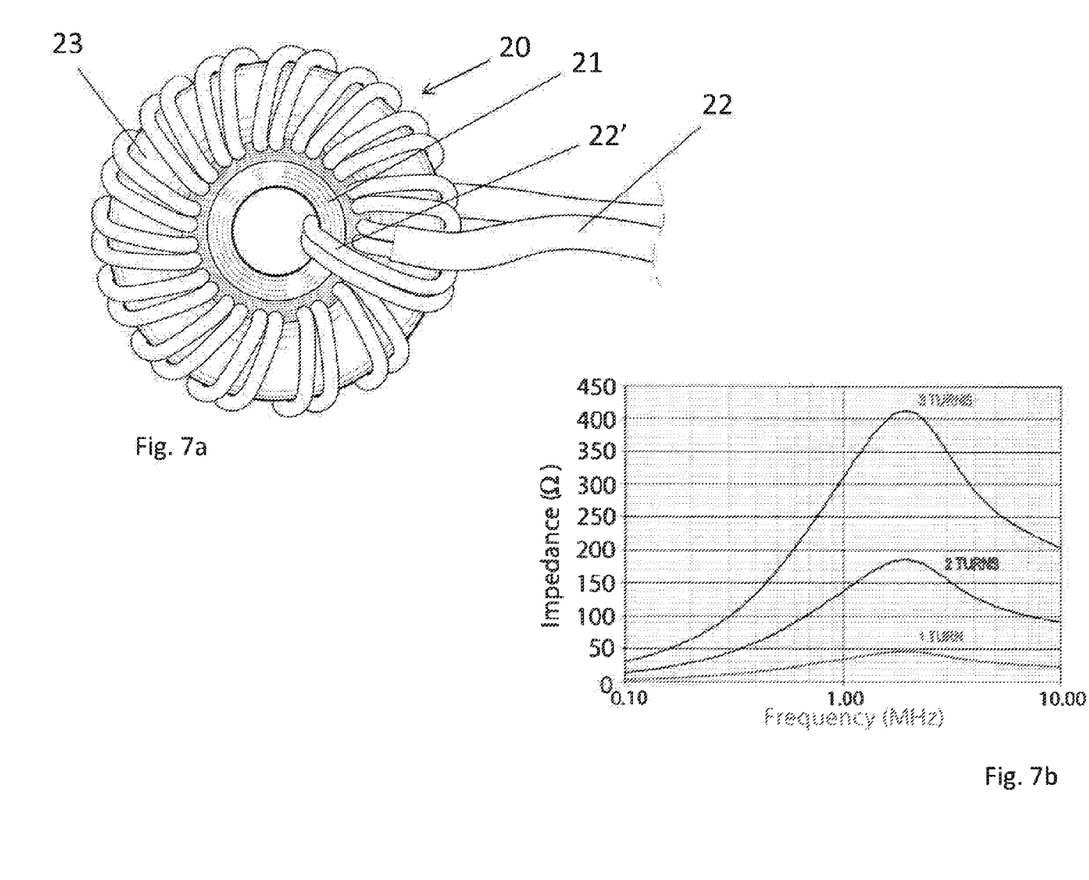

FIG. 7a shows an embodiment of an inductor 20 for use in the resonant power converter. The inductor 20 comprises a first inductor comprising an outer iron core 23 and a plurality of windings of the conductor 22 adapted to function as an inductive element (described as L2 in FIGS. 1-3 and 5a) with substantially constant inductance during normal operation. The relatively large outer iron core does not become magnetically saturated in normal operation and the outer inductor thus operates in its (substantially) linear region in normal operation. The inductor 20 further comprises an inner inductor comprising an inner iron core 21 and a single turn 22' of conductor 22 encircling the centrally placed iron core 21. The inner inductor (described as L3 in FIG. 5a) is adapted to function as a current discriminating inductor having a first inductance, typically being in the range 3-7 µH when a reverse recovery current is flowing in the reverse direction, as the reverse recovery current typically is below 3 A. The current discriminating inner inductor is further adapted to become saturated by currents being substantially larger than the reverse recovery current (typically above 10 A) which typically flows in the forward direction through the diodes Dap, DAn, such that the inductor has an inductance in normal operation being significantly less than the inductance when reverse recovery currents are running through the current discriminating inductor (preferably less than 50%, more preferably less than 20% and most preferably less than 10%). The second inductive element typically has a saturation current in the range 1-10 A, preferably 3-7 A.

FIG. 7b shows an impedance graph of the inductor 20 according to the embodiment shown in FIG. 7a. The 1-turn graph shows how the impedance of the current discriminating inductor is substantially zero when current from the DC power supply is flowing in the forward direction through current is flowing through the inductor (normal operation), as the inductor is substantially saturated and thus only operates as a resistive element. When the oscillating reverse recovery current flows through the inductor 20, the impedance of the is as large as 50Ω (at 2 MHz) as the inductor operates in its linear region with the first impedance since the reverse recovery current in the circuitry is below the saturation current of the current discriminating inductor. The current discriminating inductor thus operates in its linear region damping the current and thus reducing the reverse recovery current running through the auxiliary switch.

Please note that the embodiments described herein are not limiting the scope of the invention, as the circuitry can be adapted in any way within the scope of the appended claims.

The invention claimed is:
1. A resonant power converter comprising:
a DC power source;
a positive DC conductor;
a negative DC conductor;
a phase conductor; and
a power converting unit coupled between the DC power source and the phase conductor, the power converting unit comprising:
a first switch coupled between the positive DC conductor and the phase conductor and a first diode connected in parallel with the first switch, a second switch coupled between the negative DC conductor and the phase conductor and a second diode connected in parallel with the second switch, and a resonant auxiliary switching circuit coupled between a feeding connection on the DC power source and the phase conductor, the resonant auxiliary switching circuit comprising:

a first and second inductor coupled in series with control devices for controlling the resonant auxiliary switching circuit, and auxiliary diodes coupled in series with the control devices characterized in that the first inductor is a current discriminating inductor adapted to:

operate in its substantially linear region when a reverse recovery current is flowing through the auxiliary diodes and current discriminating inductor, and become saturated by currents flowing through the current discriminating inductor during normal operation, such that the current discriminating inductor operates with inductance reduced to less than 50% of the inductance in a linear region, when a current is flowing in the forward direction, and wherein the second inductor is adapted to have substantially constant inductance in normal operation, when the current discriminating inductor is substantially saturated.

2. The resonant power converter of claim 1, wherein the inductance of the current discriminating inductor is adapted to be reduced to less than 20% when saturated during normal operation.

3. The resonant power converter of claim 1, wherein the current discriminating inductor is an inductor comprising magnetic material adapted to become magnetically saturated after an amount of current has flowed through the current discriminating inductor.

4. The resonant power converter of claim 3, wherein the magnetic material is an iron core of the current discriminating inductor.

5. The resonant power converter of claim 1, wherein the current discriminating inductor has inductance in its linear region in the range 1-10 μH.

6. The resonant power converter of claim 1, wherein the current discriminating inductor has inductance in its linear region in the range 3-7 μH.

7. The resonant power converter of claim 1, wherein the current discriminating inductor is an inductor with a saturation current in the range 1-10 A.

8. The resonant power converter of claim 1, wherein the current discriminating inductor is an inductor with a saturation current in the range 3-7 A.

9. The resonant power converter of claim 1, wherein the first and second inductors are part of an integrated inductive component wherein:

the first inductor comprises a first iron core and at least one lead winding encircling the first iron core;

the second inductor comprises a second iron core and a plurality of lead windings encircling the second iron core; and wherein the first iron core has a smaller mass than the second iron core, such that the first iron core gets magnetically saturated faster than the second iron core when current flows in the windings.

10. The resonant power converter of claim 9, wherein the first iron core has a mass being less than 10% of the mass of the second iron core.

11. The resonant power converter of claim 9, wherein the first and second iron cores are ring or torus shaped, and wherein the first iron core is positioned at least partially inside of the second iron core.

12. The resonant power converter of claim 1, wherein the saturation current of the second inductor is more than 10 times the saturation current of the first inductor.

13. The resonant power converter of claim 1, for use in an active filter.

* * * * *